US012806726B2

(12) United States Patent
Chen et al.

(10) Patent No.: US 12,806,726 B2

(45) Date of Patent: Nov. 24, 2026

(54) WATERPROOF ROTARY MILLING HEAD

(71) Applicant: Hold Well Industrial Co., Ltd., Taichung City (TW)

(72) Inventors: Kuan-Ta Chen, Taichung City (TW); Sing-Yu Chen, Taichung City (TW)

(73) Assignee: Hold Well Industrial Co., Ltd., Taichung City (TW)

( * ) Notice: Subject to any disclaimer, the term of this patent is extended or adjusted under 35 U.S.C. 154(b) by 329 days.

(21) Appl. No.: 18/593,125

(22) Filed: Mar. 1, 2024

(65) Prior Publication Data

US 2024/0293902 A1 Sep. 5, 2024

(30) Foreign Application Priority Data

Mar. 3, 2023 (TW) ................................ 112107921

(51) Int. Cl.

*B23Q 1/70* (2006.01)
*B23C 9/00* (2006.01)
(Continued)

(52) U.S. Cl.

CPC .............. *B23Q 5/045* (2013.01); *B23C 9/005* (2013.01); *B23Q 1/70* (2013.01); *F16C 19/545* (2013.01); *F16C 33/782* (2013.01); *B23C 2260/08* (2013.01); *B23C 2260/72* (2013.01); *B23Q 11/0883* (2013.01); *B23Q 2220/006* (2013.01); *B23Q 2220/008* (2013.01);
(Continued)

(58) Field of Classification Search

CPC ................... Y10T 409/309296–309464; Y10T 409/30448; Y10T 408/94–957; B23C 9/005; B23C 2260/08; B23C 2260/72; B23Q 5/043–5/046; B23Q 2220/006; B23Q 2220/008; B23Q 1/70; B23B 2260/126; B23B 2260/008; F16C 33/7816–33/782; F16C 33/80; F16J 15/16; F16J 15/40; F16J 15/42; F16J 15/44; F16J 15/443; F16J 15/447; F16J 15/4472; F16J 15/4476

USPC ............. 409/230–233, 144; 408/238–239 A; 384/477, 480; 277/300–311, 358, 277/399–401, 403, 409, 411–412

See application file for complete search history.

(56) References Cited

U.S. PATENT DOCUMENTS

2024/0293878 A1 * 9/2024 Chen ........................ B23C 5/26

FOREIGN PATENT DOCUMENTS

| | | | |
|---|---|---|---|
| CN | 210160422 | | 3/2020 |
| CN | 111745202 | | 10/2020 |
| EP | 2799167 | A1 * | 11/2014 |

OTHER PUBLICATIONS

Search Report appended to an Office Action, which was issued to Taiwanese counterpart application No. 112107921 by the TIPO on Oct. 20, 2023, with an English translation thereof.

* cited by examiner

*Primary Examiner* — Erica E Cadugan

(74) *Attorney, Agent, or Firm* — BURRIS LAW, PLLC

(57) ABSTRACT

A waterproof rotary milling head includes a fixed unit, a rotating unit, at least one bearing unit, and a waterproof unit. The rotating unit is rotatable relative to the fixed unit, and the fixed unit and the rotating unit have a gap therebetween. The at least one bearing unit is disposed between the fixed unit and the rotating unit, and provides smooth rotation of the rotating unit relative to the fixed unit. The waterproof unit has an inner guiding conical surface that is disposed outside the at least one bearing unit and that is adjacent to the gap.

6 Claims, 4 Drawing Sheets

(51) Int. Cl.
*B23Q 5/04* (2006.01)
*B23Q 11/00* (2006.01)
*F16C 19/54* (2006.01)
*F16C 33/78* (2006.01)
*B23Q 11/08* (2006.01)
*F16C 33/80* (2006.01)

(52) U.S. Cl.
CPC .......... *F16C 33/80* (2013.01); *F16C 2322/39* (2013.01); *Y10T 409/309296* (2015.01); *Y10T 409/309352* (2015.01)

WATERPROOF ROTARY MILLING HEAD

CROSS-REFERENCE TO RELATED APPLICATION

This application claims priority to Taiwanese Invention Patent Application No. 112107921, filed on Mar. 3, 2023, the entire disclosure of which is incorporated by reference herein.

FIELD

The disclosure relates to a processing machine, and more particularly to a waterproof rotary milling head.

BACKGROUND

A conventional milling head as disclosed in Chinese Patent Publication No. CN210160422U includes a housing, a cutter handle mounted in the housing, a fixing block connected to the housing, a right fixing plate mounted to the housing, a left fixing plate mounted to the housing, and a sleeve mounted in the housing and protruding out through the left fixing plate. The fixing block has a positioning pin disposed fixedly on an upper end of the fixing block. The fixing block is mounted at the bottom of a main axis of a machine tool, and the cutter handle is driven by the main axis.

Although the aforesaid milling head is commonly used in applications, considering an operating environment where a waterproof design may be needed for the milling head, if an oil seal is used on the milling head, during high rotation of the milling head, the oil seal may experience overheating. In addition, manufacturing tolerance of the oil seal is difficult to control so that sometimes the oil seal may be too tight or too loose. If the manufacturing tolerance of the oil seal exceeds a certain threshold, components of the milling head need to be modified in accordance with the oil seal.

SUMMARY

Therefore, an object of the disclosure is to provide a waterproof rotary milling head that can alleviate at least one of the drawbacks of the prior art.

According to the disclosure, the waterproof rotary milling head includes a fixed unit, a rotating unit, at least one bearing unit, and a waterproof unit.

The rotating unit is rotatable relative to the fixed unit, and the fixed unit and the rotating unit have a gap therebetween.

The at least one bearing unit is disposed between the fixed unit and the rotating unit, and provides smooth rotation of the rotating unit relative to the fixed unit.

The waterproof unit has an inner guiding conical surface that is disposed outside the at least one bearing unit and that is adjacent to the gap.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
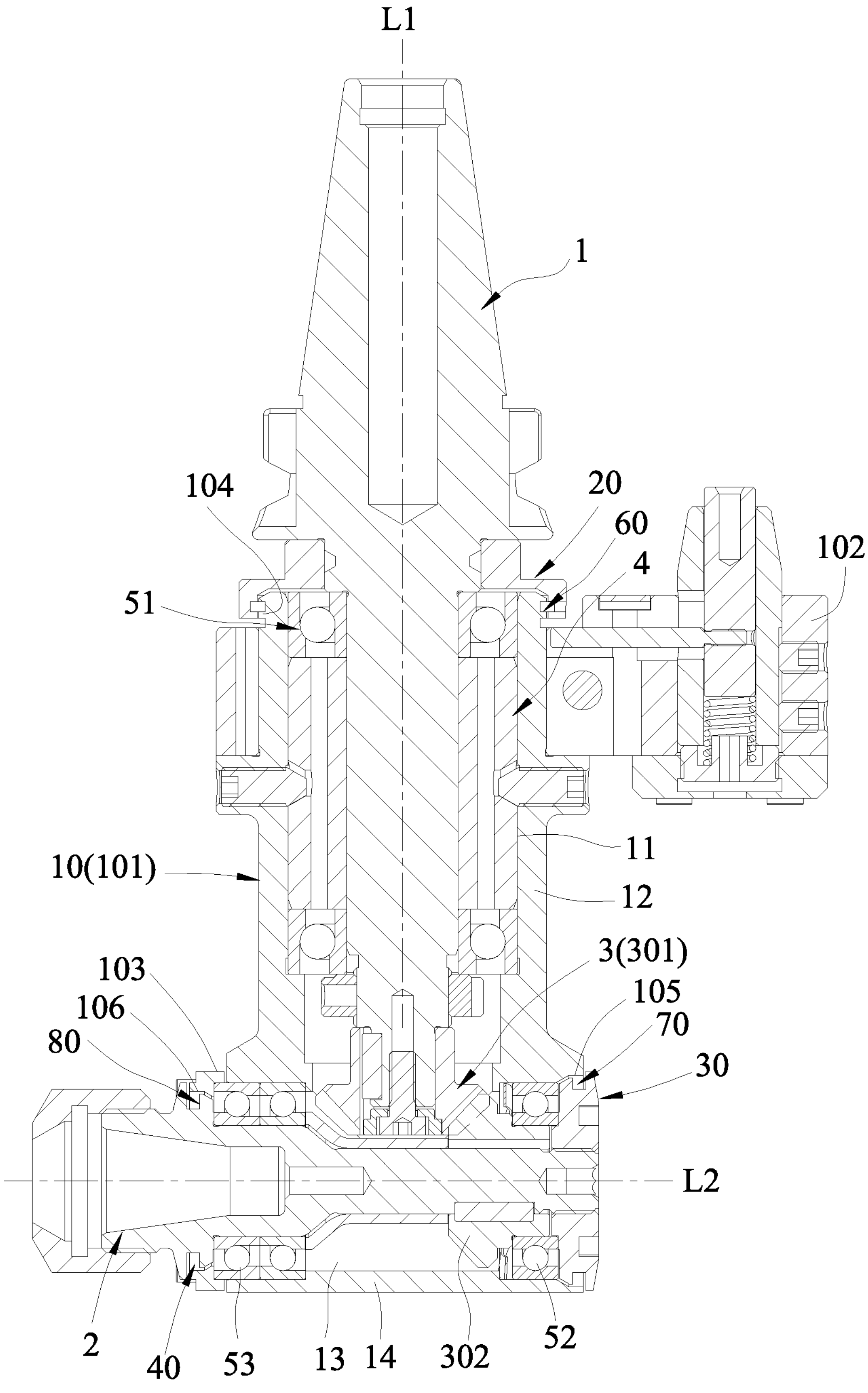
FIG. 1 is a cross-sectional view illustrating an embodiment of a waterproof rotary milling head according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Referring to FIG. 1, an embodiment of a waterproof rotary milling head according to this disclosure includes a fixed unit 10, three rotating units 20, 30, 40, three bearing units 51, 52, 53, and three waterproof units 60, 70, 80. The waterproof rotary milling head further includes a first shaft 1 mounted in the fixed unit 10, a second shaft 2 mounted in the fixed unit 10, a gear set 3 mounted in the fixed unit 10 and disposed between the first shaft 1 and the second shaft 2, and a pad 4 disposed fixedly inside the fixed unit 10. The first shaft 1 is axially disposed at the pad 4. The gear set 3 includes a first bevel gear 301 connected to the first shaft 1, and a second bevel gear 302 connected to the second shaft 2. The first bevel gear 301 and the second bevel gear 302 engage with one another.

Referring to FIGS. 1 to 4, the fixed unit 10 includes a housing base 101, a positioning seat 102 fixed to the housing base 101, an annular cover 103 positioned relative to the housing base 101, and three fixed portions 104, 105, 106. The housing base 101 has a first annular wall 12 surrounding a first axis (L1) and defining a first inner hole 11, and a second annular wall 14 surrounding a second axis (L2) perpendicular to the first axis (L1) and defining a second inner hole 13. The first inner hole 11 and the second inner hole 13 communicate with each other. The first annular wall 12 has a first inner side surface 121 adjacent to the first inner hole 11, a first outer side surface 122 opposite to the first inner side surface 121, and a top end surface 123 perpendicularly connected to the first inner side surface 121 (see FIG. 2). The second annular wall 14 has a second inner side surface 141 adjacent to the second inner hole 13, a second outer side surface 142 opposite to the second inner side surface 141, a first side end surface 143 interconnecting the second inner side surface 141 and the second outer side surface 142, and a second side end surface 144 opposite to the first side end surface 143 along the second axis (L2) (see FIGS. 3 and 4). The positioning seat 102 is mounted at the bottom of a main axis of a machine tool (this part is conventional, so not shown in the figures). The annular cover 103 is hollow and annular, is positioned relative to the second side end surface 144, and is disposed outside the second side end surface 144 along the second axis (L2). The fixed portion 104 is located at the first outer side surface 122 and is adjacent to the top end surface 123. The fixed portion 105 is located at the second inner side surface 141 and is adjacent to the first side end surface 143. The fixed portion 106 is located at an inner peripheral surface of the annular cover 103.

Referring to FIGS. 1 to 4, each of the rotating units 20, 30, 40 is rotatable relative to the fixed unit 10, and there is a gap between the fixed unit 10 and each of the rotating units 20, 30, 40. The rotating unit 20 is hollow, cylindrical, and connected to the first shaft 1, and includes a bottom surface 21 opposite to the top end surface 123, and a rotating portion 22 located beside the bottom surface 21 and opposite to the fixed portion 104 (see FIG. 2). The rotating unit 30 is disc-shaped, is detachably and threadedly connected with the second shaft 2, is sleeved on an end opening of the second inner hole 13, and includes an outer end surface 31 perpendicular to the second axis (L2), an inner end surface 32 opposite to the outer end surface 31 along the second axis (L2), and a first annular peripheral surface 33 disposed between the outer end surface 31 and the inner end surface 32 (see FIG. 3). The rotating unit 40 has a protruding annular shape, is integrally formed with the second shaft 2, and includes an outer annular surface 41 intersecting with the second axis (L2), an inner shoulder surface 42 opposite to the outer annular surface 41 along the second axis (L2), and a second annular peripheral surface 43 disposed between the outer annular surface 41 and the inner shoulder surface 42 (see FIG. 4).

Each of the bearing units 51, 52, 53 is disposed between the fixed unit 10 and a respective one of the rotating units 20, 30, 40, and provides smooth rotation of the rotating units 20, 30, 40 relative to the fixed unit 10. The bearing unit 51 is disposed between the first annular wall 12 of the fixed unit 10 and the first shaft 1. The bearing unit 52 is disposed between the second annular wall 14 of the fixed unit 10 and the second bevel gear 302 of the gear set 3. The bearing unit 53 is disposed between the second annular wall 14 of the fixed unit 10 and the second shaft 2.

Figure 2:
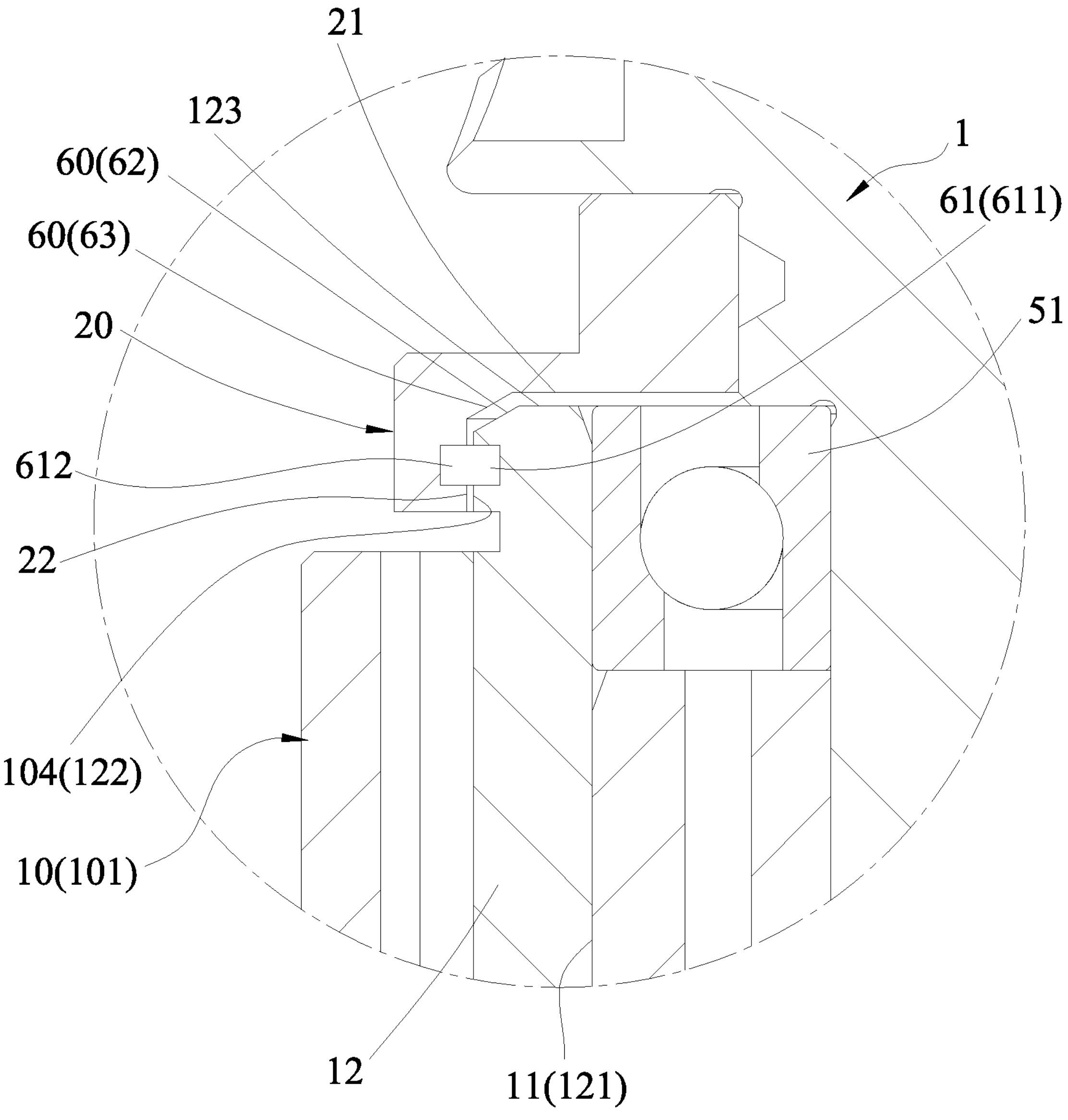
FIG. 2 is an enlarged fragmentary schematic view of FIG. 1.

Referring to FIG. 2, the waterproof unit 60 includes an annular groove 61 disposed on the fixed portion 104 and the rotating portion 22, an inner guiding conical surface 62 disposed outside the bearing unit 51 and adjacent to a gap between the fixed portion 104 and the rotating unit 20, and an outer guiding conical surface 63 laterally connected to the rotating portion 22 at an angle. The annular groove 61 is cooperatively defined by a first groove portion 611 that is recessed into the fixed portion 104, and a second groove portion 612 that is recessed into the rotating portion 22 and that is opposite to the first groove portion 611. The inner guiding conical surface 62 is located between the first groove portion 611 and the top end surface 123, and is disposed on the fixed portion 104. The inner guiding conical surface 62 interconnects the top end surface 123 and the first outer side surface 122, and gradually biases toward the second axis (L2) when extending from the top end surface 123 toward the first outer side surface 122. The outer guiding conical surface 63 and the inner guiding conical surface 62 are substantially parallel and are disposed oppositely to each other.

Figure 3:
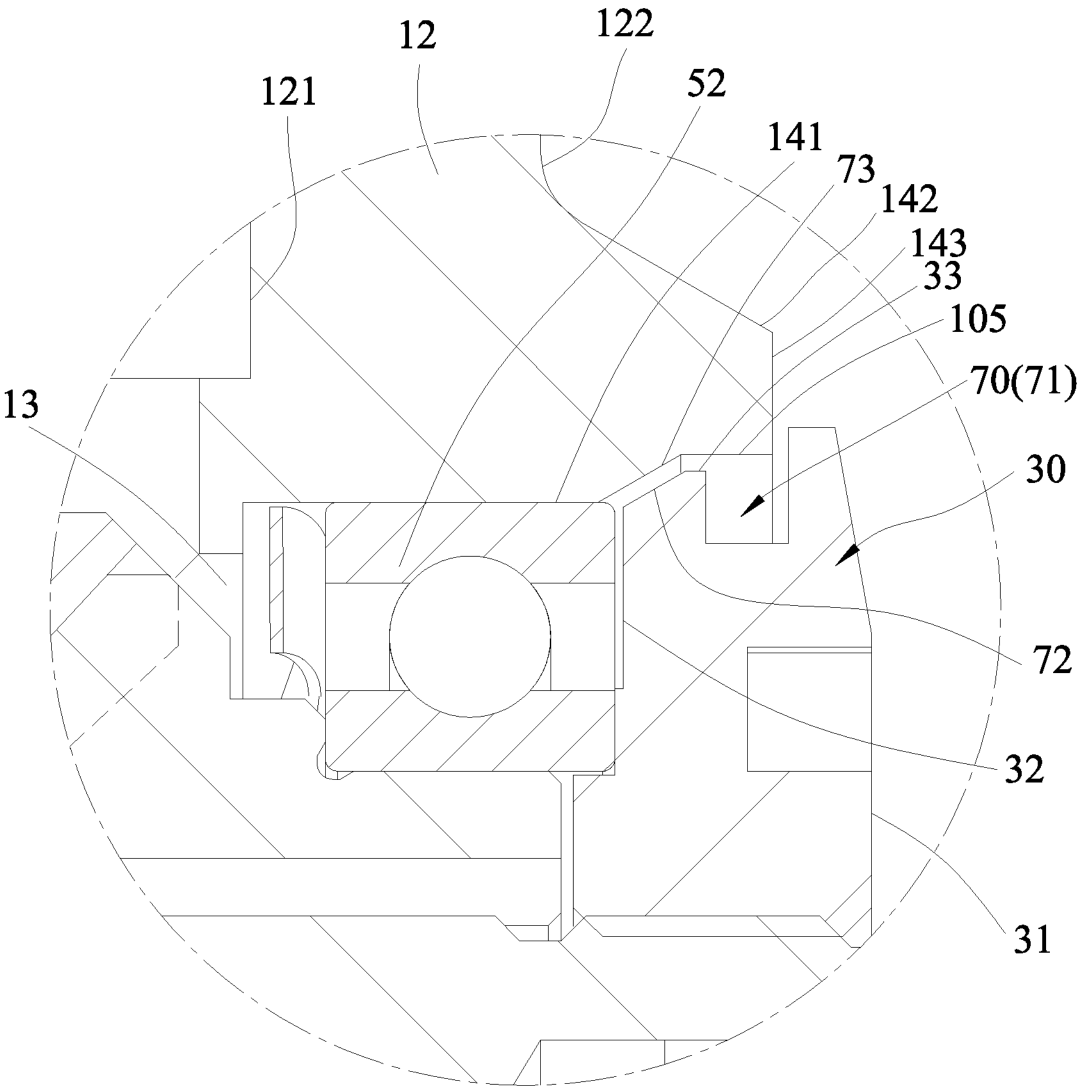
FIG. 3 is an enlarged fragmentary schematic view of FIG. 1.

Referring to FIG. 3, the waterproof unit 70 includes an annular groove 71 recessed into the first annular peripheral surface 33, an inner guiding conical surface 72 disposed outside the bearing unit 52 and adjacent to a gap between the fixed portion 105 and the rotating unit 30, and an outer guiding conical surface 73 disposed on the second inner side surface 141 and laterally connected to the fixed portion 105 at an angle. The inner guiding conical surface 72 is disposed between the annular groove 71 and the inner end surface 32, and biases toward the second axis (L2) when extending from the annular groove 71 toward the inner end surface 32. The outer guiding conical surface 73 and the inner guiding conical surface 72 are substantially parallel and are disposed oppositely to each other.

Figure 4:
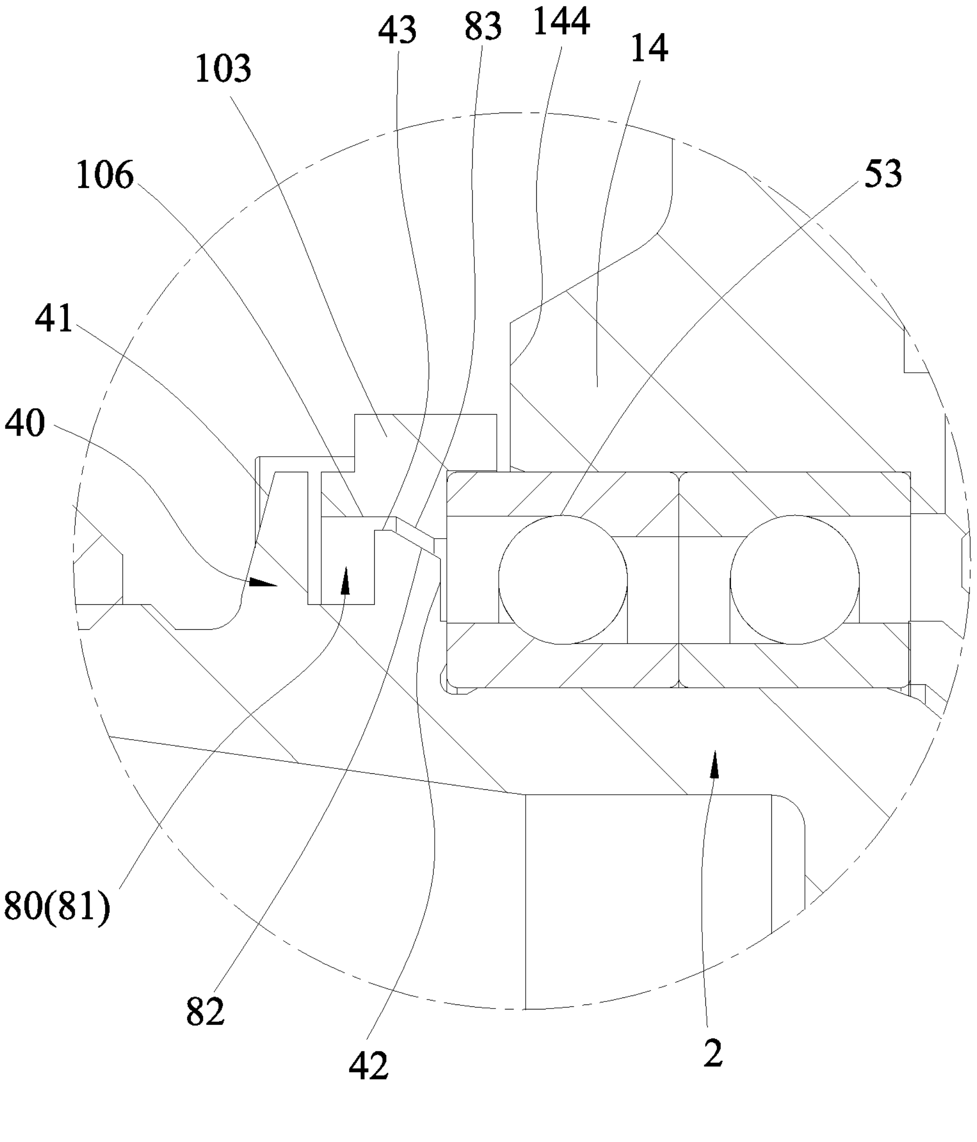
FIG. 4 is an enlarged fragmentary schematic view of FIG. 1.

Referring to FIG. 4, the waterproof unit 80 includes an annular groove 81 recessed into the second annular peripheral surface 43, an inner guiding conical surface 82 disposed outside the bearing unit 53 and adjacent to a gap between the fixed portion 106 and the rotating unit 40, and an outer guiding conical surface 83 disposed on the fixed portion 106. The inner guiding conical surface 82 is disposed between the annular groove 81 and the inner shoulder surface 42. The inner guiding conical surface 82 gradually biases toward the second axis (L2) when extending from the annular groove 81 toward the inner shoulder surface 42. The outer guiding conical surface 83 and the inner guiding conical surface 82 are substantially parallel and are disposed oppositely to each other.

To further understand the effects produced, the technical means, and the expected effects of various components of the present disclosure, detailed explanations are provided below so that a deeper and more specific understanding of the present disclosure can be obtained thereby.

As shown in FIG. 1, when assembly of the waterproof rotary milling head is completed, by virtue of the bearing unit 51, the first shaft 1 and the rotating unit 20 may be rotated smoothly and axially in the first inner hole 11 of the housing base 101, and the rotating unit 20 may be rotated relative to the fixed portion 104. The second shaft 2 and the second bevel gear 302 sleeved thereon may also be rotated smoothly and axially in the second inner hole 13 of the housing base 101 by virtue of the bearing unit 52 and the bearing unit 53. Simultaneously, the rotating units 30, 40 are also rotatable with the second shaft 2 relative to the fixed portions 105, 106.

When the second shaft 2 is mounted with a processing tool (not shown) for processing and is cooled by a cutting fluid, by virtue of the waterproof unit 60 disposed between the fixed portion 104 and the rotating unit 20, the waterproof unit 70 disposed between the fixed portion 105 and the rotating unit 30, and the waterproof unit 80 disposed between the fixed portion 106 and the rotating unit 40, a better waterproof effect may be achieved.

That is to say, by virtue of the convoluted design resulting from arrangement of the annular groove 61, the inner guiding conical surface 62, and the outer guiding conical surface 63 of the waterproof unit 60, the cutting fluid and water may not go straight to an interior of the first inner hole 11 through the gap between the fixed portion 104 and the rotating unit 20, and water pressure is decreased. Furthermore, by virtue of the conical design of the inner guiding conical surface 62 and the outer guiding conical surface 63, when the first shaft 1 and the bearing unit 51 are operated, air generated outwardly from inside may centrifugally throw and discharge water that is about to enter the first inner hole 11. Furthermore, the annular groove 61 serves as a temporary space for storing and discharging the water when a small amount of it enters the annular groove 61. By virtue of the wind shear that is generated when the first shaft 1 and the bearing unit 51 rotate, a gas curtain is generated, so that the cutting fluid may be blocked outside.

The waterproof units 70, 80 also produce a similar effect as that produced by the waterproof unit 60. Air flows generated during operation of the second shaft 2, the bearing unit 52, and the bearing unit 53 may also facilitate centrifugal discharging of water that is about to enter the second inner hole 13. Furthermore, the annular grooves 71, 81 serve as temporary spaces for storing and discharging the water when a small amount of it enters the annular grooves 71, 81. By virtue of the wind shear that is generated when the second shaft 2, the bearing unit 52, and the bearing unit 53 rotate, a gas curtain is generated, so that the cutting fluid may be blocked outside.

Therefore, in the present disclosure, by virtue of the waterproof units 60, 70, 80, a better waterproof effect is achieved when the rotating units 20, 30, 40 rotate relative to the fixed unit 10.

It should be noted that the waterproof units 60, 70, 80 of this disclosure respectively cooperate with the fixed portions 104, 105, 106 of the fixed unit 10, and the rotating units 20, 30, 40. The waterproof unit 60 may also cooperate with the fixed portion 104 of the fixed unit 10 and the rotating unit 20 independently, the waterproof unit 70 may also cooperate with the fixed portion 105 of the fixed unit 10 and the rotating unit 30 independently, and the waterproof unit 80 may also cooperate with the fixed portion 106 of the fixed unit 10 and the rotating unit 40 independently. Any two of the abovementioned combinations are also within the scope of the present disclosure.

In summary, the waterproof rotary milling head of the present disclosure has a simple structure and is easy to manufacture and assemble, so the object of the present disclosure is indeed achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A waterproof rotary milling head, comprising:

a fixed unit;

a rotating unit that is rotatable relative to said fixed unit, said fixed unit and said rotating unit having a gap therebetween;

a bearing unit that is disposed between said fixed unit and said rotating unit, and that provides rotation of said rotating unit relative to said fixed unit; and a waterproof unit that has an inner guiding conical surface disposed outside said bearing unit and adjacent to said gap, wherein said fixed unit includes a fixed portion, said rotating unit including a rotating portion that rotates relative to said fixed portion, said waterproof unit further including an annular groove disposed at least in one of said fixed portion or said rotating portion, said inner quiding conical surface being disposed on one of said fixed portion and said rotating portion, said inner quiding conical surface being located between said annular groove and said bearing unit, wherein said fixed unit further includes a housing base, said housing base having a first annular wall and a second annular wall, said first annular wall surrounding a first axis and defining a first inner hole, said second annular wall surrounding a second axis that is perpendicular to said first axis and defining a second inner hole, said first inner hole and said second inner hole communicating with each other, said first annular wall having a first inner side surface, a first outer side surface, and a top end surface, said first inner side surface being adjacent to said first inner hole, said first outer side surface being opposite to said first inner side surface, said top end surface being connected to said first inner side surface, said fixed portion being located at said first outer side surface and adjacent to said top end surface, said inner guiding conical surface interconnecting said top end surface and said first outer side surface, and inclining toward said second axis when extending from said top end surface toward said first outer side surface.

2. The waterproof rotary milling head as claimed in claim 1, wherein said waterproof unit further includes an outer guiding conical surface connected to said rotating portion, said outer guiding conical surface and said inner guiding conical surface being disposed to face each other.

3. The waterproof rotary milling head as claimed in claim 2, wherein said annular groove of said waterproof unit is cooperatively defined by a first groove portion that is recessed into said fixed portion, and a second groove portion that is opposite to said first groove portion and that is recessed into said rotating portion.

4. The waterproof rotary milling head as claimed in claim 1, further comprising a first shaft mounted in said first inner hole, a second shaft mounted in said second inner hole, and a gear set disposed between said first shaft and said second shaft, said bearing unit being disposed between said fixed unit and said first shaft, said waterproof rotary milling head further comprising two additional bearing units that are respectively disposed between said fixed unit and said gear set, and between said fixed unit and said second shaft, said rotating unit having a hollow cylindrical shape and being connected to said first shaft.

5. A waterproof rotary milling head, comprising:

a fixed unit;

a rotating unit that is rotatable relative to said fixed unit, said fixed unit and said rotating unit having a gap therebetween;

a bearing unit that is disposed between said fixed unit and said rotating unit, and that provides rotation of said rotating unit relative to said fixed unit; and a waterproof unit that has an inner quiding conical surface disposed outside said bearing unit and adjacent to said gap, wherein said fixed unit includes a fixed portion, said rotating unit being rotatable relative to said fixed portion, said waterproof unit further including an annular groove disposed at least in one of said fixed portion or said rotating unit, said inner guiding conical surface being disposed on one of said fixed portion and said rotating unit, said inner guiding conical surface being located between said annular groove and said bearing unit, wherein said fixed unit further includes a housing base, said housing base having a first annular wall that surrounds a first axis and that defines a first inner hole, said housing base further having a second annular wall that surrounds a second axis perpendicular to said first axis and that defines a second inner hole, said first inner hole and said second inner hole communicating with each other, said first annular wall having a first inner side surface that is adjacent to said first inner hole, and a first outer side surface that is opposite to said first inner side surface, said second annular wall having an inner side surface, an outer side surface, a first side end surface and a second side end surface, said inner side surface of said second annular wall being adjacent to said second inner hole, said outer side surface of said second annular wall being opposite to said inner side surface of said second annular wall, said first side end surface interconnecting said inner side surface and said outer side surface of said second annular wall, said second side end surface being opposite to said first side end surface in a direction along said second axis, said fixed portion being located at said inner side surface of said second annular wall and adjacent to said first side end surface, said rotating unit further including an outer end surface perpendicular to said second axis, and an inner end surface opposite to said outer end surface along said second axis, said annular groove of said waterproof unit and said inner guiding conical surface being disposed between said outer end surface and said inner end surface, said inner guiding conical surface inclining toward said second axis when extending from said annular groove toward said inner end surface, and wherein said waterproof rotary milling head further includes a first shaft mounted in said first inner hole, a second shaft mounted in said second inner hole, and a gear set disposed between said first shaft and said second shaft, said bearing unit being disposed between said fixed unit and said gear set, said waterproof rotary milling head further comprising two additional bearing units that are respectively disposed between said fixed unit and said first shaft and between said fixed unit and said second shaft, said rotating unit being disk-shaped, being detachably connected to said second shaft, and being sleeved on an end opening of said second inner hole, said waterproof unit further including an outer guiding conical surface connected to said fixed portion, said outer guiding conical surface and said inner guiding conical surface being disposed to face each other.

6. A waterproof rotary milling head, comprising:

a fixed unit;

a rotating unit that is rotatable relative to said fixed unit, said fixed unit and said rotating unit having a gap therebetween;

a bearing unit that is disposed between said fixed unit and said rotating unit, and that provides rotation of said rotating unit relative to said fixed unit; and a waterproof unit that has an inner guiding conical surface disposed outside said bearing unit and adjacent to said gap, wherein said fixed unit includes a fixed portion, said rotating unit being rotatable relative to said fixed portion, said waterproof unit further including an annular groove disposed at least in one of said fixed portion and said rotating unit, said inner guiding conical surface being disposed on one of said fixed portion and said rotating unit, said inner guiding conical surface being located between said annular groove and said bearing unit, wherein said fixed unit further includes a housing base and an annular cover, said housing base having a first annular wall that surrounds a first axis and that defines a first inner hole, said housing base further having a second annular wall that surrounds a second axis perpendicular to said first axis and that defines a second inner hole, said first inner hole and said second inner hole communicating with each other, said first annular wall having a first inner side surface that is adjacent to said first inner hole, and a first outer side surface that is opposite to said first inner side surface, said second annular wall having an inner side surface, an outer side surface, a first side end surface, and a second side end surface, said inner side surface of said second annular wall being adjacent to said second inner hole, said outer side surface of said second annular wall being opposite to said inner side surface of said second annular wall, said first side end surface interconnecting said inner side surface and said outer side surface of said second annular wall, said second side end surface being opposite to said first side end surface in a direction along said second axis, said annular cover being positioned relative to said second side end surface, said fixed portion being located at said annular cover, said rotating unit further having an outer annular surface that intersects with said second axis, and an inner shoulder surface that is opposite to said outer annular surface along said second axis, said annular groove of said waterproof unit and said inner quiding conical surface being disposed between said outer annular surface and said inner shoulder surface, said inner quiding conical surface inclining toward said second axis when extending from said annular groove toward said inner shoulder surface, and wherein said waterproof unit further includes an outer guiding conical surface disposed on said fixed portion, said outer guiding conical surface and said inner guiding conical surface being disposed to face each other, said waterproof rotary milling head further including a first shaft mounted in said first inner hole, a second shaft mounted in said second inner hole, and a gear set disposed between said first shaft and said second shaft, said bearing unit being disposed between said fixed unit and said second shaft, said waterproof rotary milling head further comprising two additional bearing units that are respectively disposed between said fixed unit and said first shaft and between said fixed unit and said gear set, said rotating unit having an annular shape and being disposed on said second shaft.

* * * * *